United States Patent Office 2,874,416
Patented Feb. 24, 1959

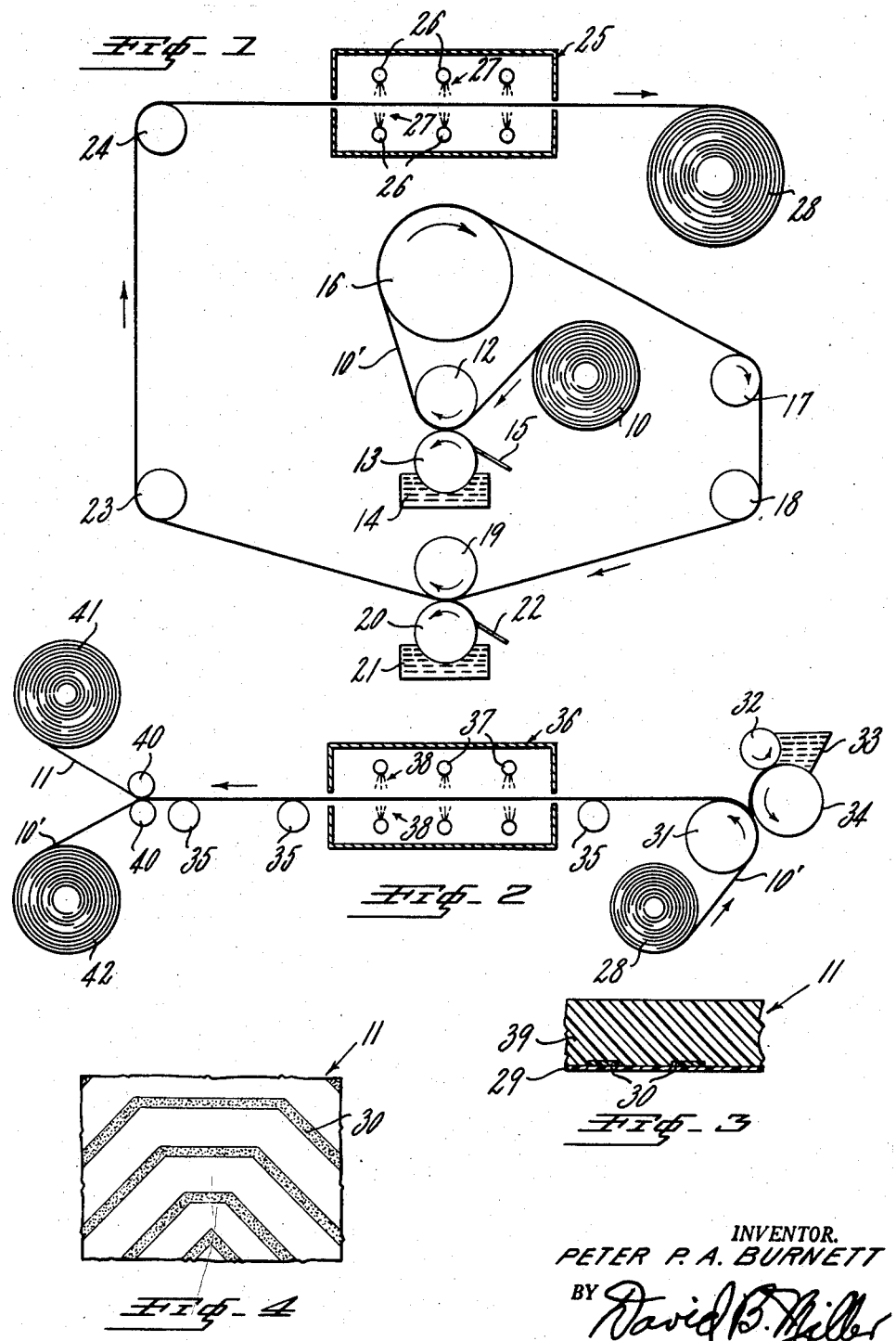

2,874,416

METHOD OF MAKING DECORATED PLASTIC SHEET MATERIAL

Peter P. A. Burnett, Stoughton, Wis., assignor to United States Rubber Company, New York, N. Y., a corporation of New Jersey Application December 8, 1953, Serial No. 396,835

8 Claims. (Cl. 18—47.5)

This invention relates to a method of making decorated plastic sheet material in which a plastic film is cast over a printed carrier sheet and the film and the printing are subsequently removed from the carrier sheet to produce the decorated plastic sheet.

Heretofore it has been proposed to make descorated plastic sheet material such as a thermoplastic resin film by printing a design from a resinous ink on a substantially inextensible carrier sheet of paper or the like, and then casting the body of the thermoplastic resin film onto the carrier sheet over this design. Thereafter, the body of the film and the design are subjected to heat to fuse integrally the resin in the film and design, after which the film bearing the design is stripped from the carrier sheet. This method is not entirely satisfactory because the printing inks available to form the design have a tendency to penetrate the paper sheet and to adhere to this carrier sheet causing the decorated sheet to be deformed or even ruptured when the film is stripped from the sheet. Although the paper carrier sheets used in this operation are generally considered to have a smooth surface, in fact these surfaces are rough and have minute crevices therein. The inks generally used in forming these designs are either dispersion inks or solution inks. These inks have a tendency to flow when subjected to heat, such as the heat necessary for fusion used in this process, into the crevices of the paper surface to be locked thereto. This is especially true of solution inks which are more thermal sensitive than many of the dispersion coatings used to form the body of the film. Furthermore, solution inks contain the resin particles dissolved in a solvent therefor. These inks tend to flow into the carrier sheet, so the dissolved resin is carried into the carrier sheet. Consequently, when this resin is fused the ink adheres to the carrier sheet, and the appearance of the film is marred as heretofore described when it is stripped from the carrier sheet.

It is a primary object of this invention to provide a novel method of forming decorated plastic film in which the printed film is formed free of the blemishes which occur when the design forming material adheres to the carrier sheet during the stripping operation. In accordance with this invention, an extremely thin, preferably clear, continuous layer of resinous coating is printed from a dispersion onto the surface of an inextensible carrier sheet such as the paper sheet heretofore described. Thereafter, a design is printed on this thin continuous layer on the carrier sheet. The body layer of the film is next cast on the carrier sheet over the printing and over the thin continuous layer, after which the decorated film including the printing and the thin continuous layer is fused and stripped from the carrier sheet as a unitary sheet of decorated plastic material.

More specifically, this invention contemplates a method of making a decorated plastic film in which a thin layer of thermoplastic resin is laid down from a dispersion on the carrier sheet by a printing operation. Preferably, this layer is printed from an organosol, a colloidal sol of plastic particles in organic liquids. Organosols and their uses are well known in the art, and are described in more detail in Rubber Age 67, 553–560 (August 1950), "Plastisols and Organosols" by Partridge and Jordan. Thereafter, the solvent is dried off by heating this layer, and this thin unfused layer of resin is printed with a discontinuous design from a resinous ink. The carrier sheet is then passed thru a heating device to fuse the resin in the printed design and in the thin printed layer, after which the heavy continuous body layer of the film is cast thereon. The film on the carrier sheet is again subjected to heat to fuse the several layers together, after which the decorated plastic film including the thin printed layer and the printed design thereon is stripped from the carrier sheet.

The printed film formed by this method when stripped from the carrier sheet will bear the design originally applied to the thin resinous layer in true, sharp reproduction without loss of color. Furthermore, this design will be protected by this thin surface layer that forms a wear surface over the design so that the design will be retained much longer under normal wear by the printed film than would otherwise be the case were this protective layer not applied thereover.

For a better understanding of the nature of this invention, reference should be had to the following description when read in conjunction with the accompanying drawings, wherein:

Fig. 1 is a schematic view illustrating the method of this invention wherein a thin continuous layer of plastic material is applied to the carrier sheet, and this thin layer is printed with a discontinuous design;

Fig. 2 is a schematic view further illustrating this invention wherein the design as prepared in accordance with Fig. 1 has a body coating of plastic material applied thereover;

Fig. 3 is a fragmentary cross-sectional view greatly enlarged of the decorated plastic film made in accordance with this invention; and Fig. 4 is a plan view of a decorated plastic film bearing a discontinuous design as contemplated by this invention.

Referring now to the drawings in which an embodiment of the method of making a decorated plastic film in accordance with this invention is illustrated, there is shown at 10 a roll of paper forming a carrier sheet on which a decorated plastic film such as that shown in Fig. 4 at 11 is to be produced. In accordance with this invention the sheet 10' of paper first has applied thereto a thin layer 29 of resin from an organosol. In the embodiment shown in Fig. 1 this operation is performed by leading the paper from the roll 10 about a rubber covered back-up roller 12. A printing roll 13 runs against the other side of the paper 10' and also runs in a bath 14 of a dispersion of resin particles. A doctor blade 15 adjacent the applicator or printing roller 13 meters the quantity of material applied from the dispersion to the paper 10 by the printing roller 13 in the well-known printing arrangement.

In accordance with this invention, the layer 29 is then dried. In the embodiment shown this is done by leading the paper 10' containing the thin layer 29 of resinous coating about a rotating heating cylinder 16 in which steam or the like may be circulated to heat the thin resinous film 29 to dry off the solvent in the film but to leave this film unfused. After the sheet 10' containing this thin film leaves the drying drum 16, it passes about the guide rollers 17, 18 to be directed to a second printing station. As shown, this station comprises the rubber covered back-up roller 19 about which the sheet 10' is led. Running in contact with the side of the paper 10' containing the layer 29 is a printing roller 20, such as a rotogravure roller, having etched or otherwise formed therein indentations in its surface which are adapted to print a discontinuous design on the thin layer 29 on the carrier sheet 10'. This roller 20 runs in a bath 21 of a resinous ink, and a doctor knife 22 is associated therewith to remove that portion of the ink from the surface of the roller 20 which is not deposited in the indentations in this surface, so that only a discontinuous design 30 of the ink is printed on the thin layer 29 on the carrier sheet 10'. After the carrier sheet is thus printed with the discontinuous design 30, it passes about the directing rollers 23 and 24 to be led through a fusing oven 25 where the thin layer 29 and the discontinuous design 30 are fused. In the embodiment shown, this oven comprises a series of spaced pipes 26 having a multiplicity of air holes therein. Heated air is admitted to the pipes 26 to escape through these air holes as indicated at 27 to impinge upon the carrier sheet 10' so that the resin deposited thereon is fused.

After the carrier sheet has passed through the fusing oven 25 in the embodiment shown in the drawings, this carrier sheet is wound on a roll 28. This may be found desirable for convenience in handling the carrier sheet, but it will be appreciated that the operation can be set up as a continuous one and if this is done, the carrier sheet need not be wound in a roll after passing through the fusing oven 25, but may be led directly to the coating apparatus where the body of the film is applied to the carrier sheet 10'. Indeed, if such a continuous operation is used, the carrier sheet need not necessarily pass through the fusing oven 25 but it may pass through a heating device which will dry the design 30, but will not fuse it, prior to the application of the body layer of the film thereover. However when the sheet 10' is not to pass directly to the station where the body layer of the film 11 is to be applied, but is to be rolled or otherwise handled roughly, it is desirable to fuse the layer 29 and design 30 as shown, for this layer and design have no strength in the unfused state and may easily be destroyed by such handling.

Referring next to Fig. 2 paper 10' bearing the thin layer 29 and design 30 is led from the roll 28 about a rubber covered back-up roller 31 of a reverse roll coater. The meter roller 32 meters the thickness of the resin film 39 applied by the applicator roller 34 from the organosol bath 33 to the sheet 10'. The sheet 10' is run through this coater in such a position that the body of the film is applied by the roller 34 over the thin layer 29 and the design 30. After the sheet 10' leaves this coater, it is led through a fusing oven 36 which comprises the spaced air pipes 37 having holes therein. Heated air is admitted to the pipes 37 to escape therefrom through the air holes and to impinge on the paper 10' as indicated at 38 to fuse film 11. After the printed film 11 including the body layer 39, the printing 30 and the thin layer 29 are thus fused, the carrier sheet 10' is led to a nip of a pair of stripping rollers 40 at which point the fused film 11 is removed from the carrier sheet 10' and wound into a roll 41. The carrier sheet 10' as shown may be wound into a roll 42 for reuse as desired.

Although specific apparatus has been shown for carrying out the method of this invention, it will be appreciated that there are many forms of apparatus well-known in the film forming art which might be substituted for the apparatus shown to perform one or more of the steps of the method in accordance with this invention.

Further illustrating this invention, a decorated plastic film was made having the following components. Firstly, a thin layer approximately 0.1 mil thick was printed on a paper carrier sheet from an organosol having the following composition:

| Ingredients: | Parts (by weight) |
| --- | --- |
| Polyvinyl chloride polymer or copolymer (dispersion grade) | 100 |
| Di-2-ethyl hexyl phthalate | 40 |
| Xylol | 60 |
| Naphthenic or aliphatic hydrocarbon thinner | 40 |

This thin layer was then heated to dry off the solvents, but was not heated sufficiently to fuse the resin in the layer.

A discontinuous design was printed over this unfused dried layer from a solution ink having the following composition:

| Ingredients: | Parts (by weight) |
| --- | --- |
| Vinyl chloride—acetate copolymer (e. g., that sold under trade mark VYNS, by Carbide and Carbon, Co.) | 100 |
| Di-2-ethyl hexyl phthalate | 20 |
| Copper phthalocyanin | 100 |
| Methyl ethyl ketone | 1200 |

The thermal sensitivity and the viscosity of this ink are such that when this ink is printed directly on a carrier sheet and a body of film is cast thereover, and then fused, the areas printed with the ink adhere more strongly to the carrier sheet during the stripping operation than do the unprinted areas.

The thin layer containing this printed design was then heated to fuse the resin in the thin layer and in the printed design. Theerafter, a body of the film approximately .2 mils thick was cast over this thin layer and the printed design from an organosol having the following composition:

| Ingredients: | Parts (by weight) |
| --- | --- |
| Vinyl chloride polymer or copolymer (dispersion grade) | 100 |
| Di-2-ethyl hexyl phthalate | 40 |
| Titanium dioxide | 15 |
| Xylol | 60 |
| Napthenic or aliphatic hydrocarbon thinner | 40 |

Thereafter, the carrier sheet bearing the layers of resinous material was subjected to heat sufficient to fuse these materials into a unitary mass. The film thus formed was stripped from the carrier sheet, with no detrimental adhesion between the carrier sheet and the film, and with the design clearly and sharply reproduced in the sandwich between the thin layer and the body of the film.

The invention has peculiar utility when it is desired to produce a decorated film bearing a printed design which is printed from a solution ink. Such inks present peculiar problems because the resin therein is dissolved in the solvent. Because of this characteristic, the resin from these inks is more readily carried into a paper carrier sheet to be interlocked with the fibers of the sheet when the resin is fused. Consequently these inks have a greater tendency to adhere to the carrier sheet than do other inks, so that the design is marred when the film is stripped from the carrier sheet. Furthermore, as pointed out above generally the solution inks are more thermal sensitive than other inks commonly used so that they flow more readily into the rugosities of the carrier sheet when they are subjected to heat such as will occur when the resins are heated to fuse them. For these reasons this invention has peculiar advantages when it is desired to print from these solution inks because the thin layer of resin particles which are applied from a dispersion will form a barrier which these inks will not penetrate. The resin particles from this dispersion will not penetrate the carrier sheet, so that when the decorated film is stripped from the carrier sheet this thin layer will be stripped from the carrier sheet cleanly Although the instant invention will be found to have peculiar advantages when the printing is to be done from a solution ink, it will be found advantageous in other applications, such for example in applications where the ink contains soluble dyestuffs. Thus if ink is used containing soluble dyestuffs, even though the particles of resin may not penetrate the carrier sheet, the soluble dyestuffs may be carried into the carrier sheet by their solvent. When such inks are used, if any of the dyestuffs are carried into the carrier sheet, there will result a loss of color and sharpness in the design when it is removed from the sheet. By contrast, when the method of this invention is used with such inks, the think resinous layer will provide a barrier against such penetration of the carrier sheet by the dyestuffs.

Although the designs normally produced in these films are of such a nature that it will be preferable to have a continuous layer of the thin layer of resin, it will be appreciated that for certain designs in which the design appears only at infrequently spaced apart points in the film, the thin layer need not be a continuous one. In these infrequent instances, the thin layer may be a discontinuous one which is laid down on the carrier sheet at spaced apart points to underlie a design which is printed thereover. For such designs, even though the thin layer is discontinuous, the design will be printed over this thin separating layer, and when the body of the film is cast over both the design and this thin layer, the thin layer will be fused into the body of the film to achieve the advantages of this invention.

Other and further modifications of the method in accordance with this invention will occur to those skilled in the art, and therefore it should be understood that the foregoing is merely a description of a representative specific embodiment of the invention.

Having thus described my invention, what I claim and desire to protect by Letters Patent is:

1. The method of forming a decorated thermoplastic resin film, said film being produced on a carrier sheet without penetration thereof by the film components, and having a design which is protected by a wear surface, which comprises: (a) applying a thin layer of a thermoplastic resin organosol to a substantially inextensible carrier sheet without penetrating the interstices thereof; (b) printing a thermoplastic resin ink in a discontinuous design layer directly on said thin layer before any film strength has been developed in said thin layer; (c) casting a body layer of a thermoplastic resin organosol over said thin layer and said design layer; (d) fusing said layers integrally together by applying heat thereto at atmospheric pressure; and (e) stripping the resulting decorated film from said sheet.

2. The method of claim 1, in which said thin layer is applied in step (a) as a continuous layer to said sheet.

3. The method of claim 1, in which, after each of steps (a) and (b), the organic liquids contained in said organosol and said ink, respectively, are removed by evaporation, the application of heat for this purpose being controlled so as to be insufficient to effect the fusion of said thermoplastic resin.

4. The method of claim 1, in which said ink is a solution ink.

5. The method of claim 1, in which, after step (b), said thin layer and said design layer are fused integrally together by applying heat thereto at atmospheric pressure.

6. The method of claim 1 which is made continuous by re-using said sheet in step (a) without any preliminary treatment thereof following step (e).

7. The method of claim 1, in which said sheet, prior to step (a), is an uncoated paper sheet which has not been subjected to any treatment designed to render same non-penetrable.

8. The method of forming a decorated vinyl resin film, said film being produced on a carrier sheet without penetration thereof by the film components, and having a design which is protected by a wear surface, which comprises: (a) applying a thin, continuous layer of a vinyl chloride-containing resin organosol to a paper carrier sheet without penetrating the interstices thereof; (b) applying heat to said layer to remove the organic liquids contained therein by evaporation without effecting the fusion of said resin; (c) printing a vinyl chloride-containing resin ink in a discontinuous design layer directly on said thin layer before any film strength has been developed in said thin layer; (d) applying heat to said design layer to remove the organic liquids contained therein by evaporation without effecting the fusion of said resin in either of said layers; (e) casting a body layer of a vinyl chloride-containing resin organosol over said thin layer and said design layer; (f) fusing said layers integrally together by applying heat thereto at atmospheric pressure; and (g) stripping the resulting decorated film from said sheet.

References Cited in the file of this patent

UNITED STATES PATENTS

| | | |
|---|---|---|
| 2,351,933 | Decker et al. | June 20, 1944 |
| 2,404,073 | Karfiol et al. | July 16, 1946 |
| 2,558,804 | Wittgren | July 3, 1951 |
| 2,627,486 | Smith | Feb. 3, 1953 |
| 2,629,679 | Rathke | Feb. 24, 1953 |
| 2,704,735 | Hedges et al. | Mar. 22, 1955 |
| 2,733,180 | Pinto | Jan. 31, 1956 |